United States Patent [19]
Karaoke et al.

[11] Patent Number: 5,304,262
[45] Date of Patent: Apr. 19, 1994

[54] TWO-PIECE OIL RING FOR USE IN INTERNAL COMBUSTION ENGINE, STEEL WIRE OF MODIFIED CROSS-SECTION FOR USE AS MATERIAL OF THE OIL RING AND METHOD OF PRODUCING THE STEEL WIRE

[75] Inventors: Takao Karaoke, Shimane; Ken Nakamura; Iwao Kashiwagi, both of Yasugi, all of Japan

[73] Assignee: Hitachi Metals, Ltd., Tokyo, Japan

[21] Appl. No.: 822,209

[22] Filed: Jan. 17, 1992

[30] Foreign Application Priority Data

Jan. 19, 1991 [JP] Japan .................................. 3-019302
May 8, 1991 [JP] Japan .................................. 3-102597

[51] Int. Cl.$^5$ .......................... C21D 8/00; C22C 38/18; B23P 15/06; F16J 9/20
[52] U.S. Cl. .................................. 148/589; 148/325; 29/888.073; 29/888.074; 277/138; 277/235 A
[58] Field of Search ............. 148/318, 325, 326, 12 E, 148/12 B, 12.1, 589; 277/235 A, 138, 139, 140; 29/888.073, 888.074

[56] References Cited

U.S. PATENT DOCUMENTS

| | | | |
|---|---|---|---|
| 4,085,490 | 4/1978 | McCormick et al. | 148/12 R |
| 4,948,556 | 8/1990 | Kumagai | 148/318 |
| 4,966,751 | 10/1990 | Kaede et al. | 148/318 |

FOREIGN PATENT DOCUMENTS

| | | |
|---|---|---|
| 2609229 | 3/1976 | Fed. Rep. of Germany . |
| 3725495 | 7/1987 | Fed. Rep. of Germany . |
| 1346817 | 2/1963 | France . |
| 1-18526 | 1/1989 | Japan . |
| 2129091 | 3/1983 | United Kingdom . |

OTHER PUBLICATIONS

Patent Abstracts of Japan M-279 Feb. 24, 1984 vol. 8/No. 43 (58-197455).

*Primary Examiner*—Melvyn J. Andrews
*Assistant Examiner*—Sikyin Ip
*Attorney, Agent, or Firm*—Antonelli, Terry, Stout & Kraus

[57] ABSTRACT

A two-piece oil ring, for use in an internal combustion engine, with the oil ring being made from a martensitic stainless steel material having high consisting essentially of more than 0.8 wt % but less than 0.95 wt % of C, not more than 1.0 wt % of Si, not more than 1.0 wt % of Mn, from 15.0 wt % to 20.0 wt % of Cr and a balance substantially Fe and incidental impurities. The oil ring has a hardness ranging from HV300 to HV450 and a substantially H- or X-shaped cross-section. A web portion interconnecting left and right halves of the H- or X-shaped cross-section has a thickness not greater than 0.3 in terms of the ratio of the total thickness of the ring. Oil passage holes are formed in the web portion. A nitrided layer is formed on the sliding surface thereof which makes a sliding contact with the inner surface of a cylinder of the engine. The material may further contain suitable amounts of at least one of Mo, W, V, Nb, Ni and Co. The oil ring is produced by bending a wire of the martensitic stainless steel material by a process including warm roll dies plastic working and a subsequent cold roll dies plastic working through which a modified cross-section is imparted to the material, continuous annealing, punching for forming oil passage holes by punching, and continuous hardening and tempering.

13 Claims, 3 Drawing Sheets

F I G. 3
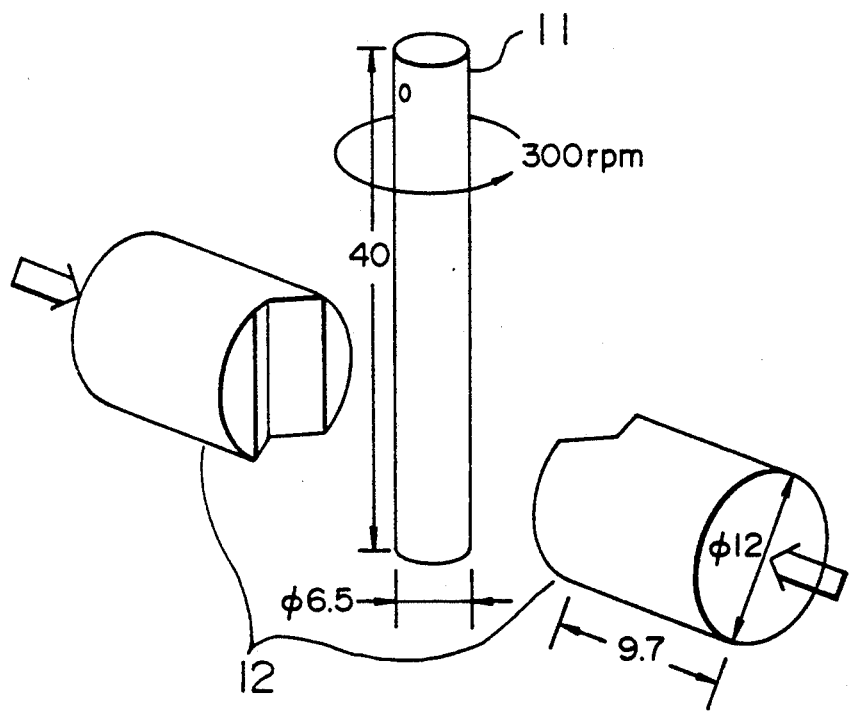

TWO-PIECE OIL RING FOR USE IN INTERNAL COMBUSTION ENGINE, STEEL WIRE OF MODIFIED CROSS-SECTION FOR USE AS MATERIAL OF THE OIL RING AND METHOD OF PRODUCING THE STEEL WIRE

BACKGROUND OF THE INVENTION

1. Field of the Invention

The present invention relates to a two-piece steel oil ring for use in internal combustion engines, to a steel wire of a modified cross-section for use as the material of the oil ring, and to a method of producing the steel wire.

2. Description of the Related Art

In general, there are two types of steel oil rings for use in internal combustion engines, namely, a three-piece type steel oil ring composed of a pair of rings having a rectangular cross-section and a spring, and a two-piece type steel oil ring which is rather new and which is composed of a single grooved ring with a modified cross-section and a spring.

Demand for two-piece oil rings in lieu of three-pieces oil rings is increasing in order to reduce the number of parts and, hence, cost. The grooved ring with modified cross-section used as a part of the two pieces oil ring has a cross-section of a complicated shape such as, for example, substantially H-shaped or X-shaped cross-section. In addition, this ring has a comparatively large degree of a modification of cross-section, that is, the ratio of the thickness of the web portion bridging both side portions to the thickness of both side portions is relatively small.

Demand also exists for use of steel alloys having large contents of alloying elements as the ring material, in order to improve resistance to wear, scuffing and sulfuric acid corrosion.

Usually, an internal combustion engine employs a plurality of piston rings including compression rings and oil rings. The compression ring can be produced without substantial difficulty because it has a simple cross-section approximating a rectangle. In fact, compression rings have been shifted to be made of steel alloys having high contents of alloying elements, e.g., 17% Cr type martensitic stainless steel.

Three-piece oil rings usually have a ring member which is generally referred to as "side rail", with the side rail, in most cases, being made of a stainless steel such as SUS 420 J2 (0.36% C-13% Cr type) or a martensitic stainless steel of 0.65% C-13% Cr type. This member also has a simple cross-section approximating a rectangle so that it can be produced by conventional methods such as cold rolling or cold drawing. Examples of the side rail for use in three-piece oil ring are a ring of 0.65% C-13% Cr type stainless steel as disclosed in Japanese Patent Examined Publication No. 61-54862 and 0.55% C-7% Cr type stainless steel as disclosed in Japanese Patent Unexamined Publication No. 61-59066.

Demand also exists for higher degree of alloying of oil ring materials. Resistances to wear, scuffing and corrosion of two-piece oil ring are expected to be appreciably improved by increasing the contents of alloying elements in the ring material. It is, however, extremely difficult to employ, as a material of the ring member of two-piece oil rings with modified cross-section, a steel having higher carbon content than conventional material, e.g., a martensitic stainless steel containing more than 0.8 wt % of C and more than 15 wt % or Cr. More specifically, a thin ring has a complicated cross-sectional shape with large degree of modification from ordinary rectangular shape, so that a heavy plastic working has to be performed when deforming the cross-section. It has been experimentally determined, that cracks tend to be generated in the boundary between the web portion which undergoes strong vertical compression force and flange portions which do not receive comparatively small compression during the plastic working. Furthermore, in order that an oil ring performs expected functions, the ring surface is strictly required to be highly smooth, e.g., 3S or smoother in terms of surface roughness, and to be devoid of defects such as dents or scratches. When conventional cold drawing is employed in the production of an oil ring from an alloy material having high contents of alloying elements, cracks tend to be generated in the boundary between the web and the flanges due to inferior workability of this type of material and due to the large degree of modification of cross-section. In order to prevent such cracking, it is necessary to reduce the amount of the working to be effected per single pass of the cold working and the amount of working per single annealing cycle. Consequently, the number of passes and the number of annealing cycles to be performed before the final product is obtained are increased. The increase in the number of passes and annealing cycles not only increases the risk of damage to the ring material but also raises the production cost. For these reasons, two-piece oil rings could not be commercially produced from a martensitic stainless steel containing more than 0.8 wt % of C and more than 15 wt % or Cr.

The ring member of a two-piece oil ring is produced by modifying the cross-section of a wire into a required shape and then perforating the web portion so as to form a series of plurality of through-holes as oil passage holes. Such perforation can be practically effected only by punching, due to restriction from the production cost and work efficiently. It has proved that such punching is extremely difficult to conduct when the material has high contents of alloying elements.

More specifically, while conventional steel materials having low contents of alloying elements enables punching even when they have been quenched and tempered to the required hardness of HV300 to HV450, punching is materially impossible to conduct for the material having high contents of alloying elements even when the material has been heat-treated to exhibit hardness falling within the above-described range. A method also has been adopted conventionally in which punching is executed subsequently to shaping into the desired cross-section without employing annealing. Such method also cannot be applied to the production from the above-mentioned material having high contents of alloying elements.

SUMMARY OF THE INVENTION

Accordingly, an object of the present invention is to provide a method of producing a two-piece oil ring which is made from a steel having high contents of alloying elements and which is superior in resistance to wear, scuffing and corrosion by sulfuric acid.

Another object of the present invention is to provide a steel wire with a modified cross-section suitable for use as the material of the above-mentioned two-piece oil ring, as well as a method of producing such a steel wire.

The method of the present invention has made it possible for the first time to produce a steel wire of a modified cross-section suitable for use as the material of a two-piece oil ring having a complicated cross-section and made from a steel having high contents of alloying elements and to produce such an oil ring.

According to one aspect of the present invention, there is provided a two-piece oil ring for use in an internal combustion engine, made from a base material containing more than 0.8 wt % but less than 0.95 wt % of C, not more than 1.0 wt % of Si, not more than 1.0 wt % of Mn, from 15.0 wt % to 20.0 wt % of Cr and the balance substantially Fe and incidental impurities, with the base material having been subjected to hardening and tempering so as to exhibit a hardness ranging from HV300 to HV450. The oil ring has a substantially H- or X-shaped cross-section defined by radially inner and outer circumferential grooves formed therein, with a web portion interconnecting left and right halves of the H- or X-shaped cross-section having a thickness which is not greater than 0.3 in terms of the ratio to the total thickness of the left and right halves. The oil ring further includes a plurality of oil passage holes formed in the web portion at a predetermined spacing in the circumferential direction and a nitrided layer formed on at least a sliding surface thereof which makes a sliding contact with the inner surface of a cylinder of the engine.

The base material of the oil ring may further contain at least one material selected from a group consisting of: at least one of 0.5 wt % to 3.0 wt % of one or both of Mo and W in terms of (Mo+W/2); 0.05 wt % to 2.0 wt % of one or both of V and Nb in terms of (V+Nb/2); not more than 12 wt % of Co; and not more than 5 wt % of Ni.

According to another aspect of the invention, there is provided a steel wire for use as the material of the piston ring, with the wire being made of the above-specified material and having required hardness, cross-sectional shape and oil passage holes formed by punching.

According to a further aspect of the invention, there is provided a method of producing a steel wire for use as a material of a two-piece oil ring of and internal combustion engine, comprising the steps of preparing a martensitic stainless steel material containing more than 0.8 wt % but less than 0.95 wt % of C and from 15.0 wt % to 20.0 wt % of Cr; forming the material into a wire having a substantially H- or X-shaped cross-section of the two-piece oil ring, through a warm plastic working effected by a power-driven or non-driven roll dies and a cold plastic working effected by a power-driven or non-driven roll dies; annealing the wire by a continuous annealing furnace; forming oil passage holes in a web portion of the wire by punching; and subjecting the wire to a continuous hardening and tempering so as to obtain a hardness of the wire ranging from HV300 to HV450.

The above and other objects, features and advantages of the present invention will become clear from the following description of the preferred embodiments when the same is read is in conjunction with the accompanying drawings.

BRIEF DESCRIPTION OF THE DRAWINGS

FIG. 3 is an exploded schematic perspective view of a critical portion of a testing apparatus used for measuring amount of wear, anti-scuffing property and amount of wear under corrosive condition of a test material;

DETAILED DESCRIPTION OF THE INVENTION

Figure 1:
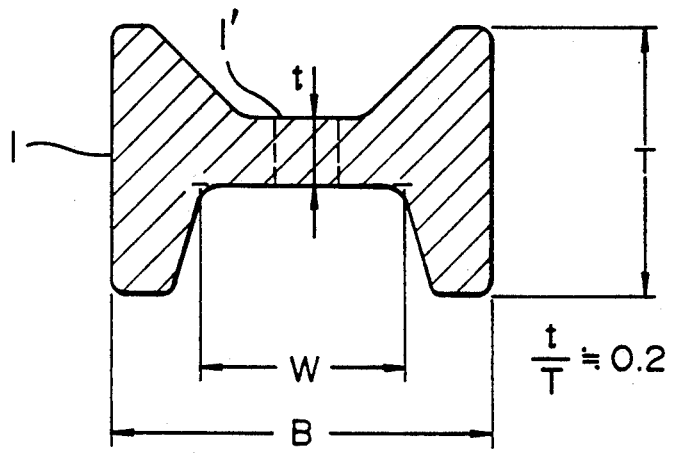
FIG. 1 is a cross-sectional view of a two-piece oil ring for use in an internal combustion engine.

The production method in accordance with the present invention can be broadly applied to various martensitic stainless steel containing more than 0.8 wt % but less than 0.95 wt % of C and from 15 wt % to 20 wt % of Cr. More practically, the steel material to which the production method of the present invention can be applied may contain, in addition to C, Cr and Fe, not more than 1.0 wt % of each of Si and Mn as deoxidizing elements, 0.5 to 3 wt % one or both of Mo and W in terms of Mo+W/2, 0.05 to 2.0 wt % of one or both of V and Nb in terms of V+Nb/2, less than 12 wt % of Co, and less than 5 wt % of Ni.

Thus, the present invention provides a method of producing a wire of a modified cross-section suitable for use as the material of a two-pieces oil ring by using a warm roll dies, as well as a method for forming oil passage holes in the wire, thus making it possible for the first time to produce a two-piece oil ring having a complicated cross-section and made from a steel having a high alloying elements content.

One of the critical features of the production method of the present invention resides in the use of a warm roll dies. This type dies eliminates the necessity for any strong lubricant such as a metal soap which is essentially used in solid bore type dies. Removal of such a lubricant after drawing is extremely difficult and roughening of the product surface occurs during intermediate annealing due to presence of such lubricant. The present invention overcomes this problem due to elimination of use of such lubricant. The warm working employed in the method of the present invention makes it possible to effect a large deformation on the steel material which exhibits reduced workability of deformability due to high contents of alloying elements. Consequently, a wire of a large degree of cross-sectional modification can be obtained without risk of cracking and without accumulation of working strain. This makes it possible to omit intermediate annealing, thus offering a higher efficiency of forming a wire. Furthermore, the warm working performed by a roll dies provides a large plastic deformation of the steel alloy material into the roll bore of the dies, which makes it possible to produce a wire of a cross-section having sharp corners, i.e., corners of small radii of curvature.

Preferably, the temperature of the warm working is determined to be as high as possible within a range which does not produce any quench hardening effect, so as to make it possible to fully enjoy the merits of the warm working, i.e., elimination or reduction in the number of annealing cycles. Heating of the steel alloy material is preferably conducted by a high-frequency induction method because this method does not produce any risk of sparking and because deterioration of surface due to oxidation is suppressed by virtue of quick heating which is made possible by this heating method.

The production method of the present invention also employs a cold working conducted by roll dies. As is the case of the warm working by roll dies described before, the cold working with roll dies also eliminates the use of strong lubricant such as metal soap and, hence, makes it possible to improve the state of surface of the product while attaining the required dimensional precision. Preferably, the roll dies used both in the warm working and cold working are of power driven type, since this type of roll dies offers advantages such as large plastic deformation of the material, prevention of cracking and improvement in the working efficiency. The method of the present invention, however, can satisfactorily be accomplished by the use of non-driven roll dies.

Thus, according to the present invention, it is possible to produce a steel wire having a high dimensional precision and a large degree of cross-sectional modification, by virtue of the use of the warm roll dies and cold roll dies.

The wire having modified cross-section produced through warm roll dies working and subsequent cold roll dies working is then subjected to a punching which is conducted for the purpose of forming oil passage holes, and is then heat-treated in a continuous hardening and tempering heat treating apparatus which maintains a protective atmosphere, so as to obtain a required hardness ranging between HV300 and 450. Usually, the wire is then delivered to a piston ring manufacturer.

The second critical feature of the invention of this application resides in that punching is employed as the method of forming oil passage holes in the wire of modified cross-section annealed in the continuous heat-treated surface. Namely, it has been found that punching can be successfully carried out only after the annealing. The annealing is conducted for the purpose of suitably relieving stress which has been caused during the plastic working so as to adjust the wire hardness to HV200 to 380, thereby preventing overload of the punch and dies, while suppressing formation of burrs. A more significant effect produced by this method is a tension annealing effect which makes it possible to produce a highly straightened wire. According to this method, therefore, it is possible to readily introduce the material into a punching device which employs punches and dies of very small diameters such as 0.6 mm, 0.8 mm or so. In a preferred form of the method of the invention, the punching is conducted in such a manner so as to punch a series of oil passage holes at one time. In such a case, the dies and guides are arrayed in the direction of the pass line. High degree of straightness of the material, therefore, is a very important factor. As explained before, annealing by a continuous heat-treating furnace is not essential in the case where a conventional steel material having low contents of alloying elements is used. In the method of the present invention, however, this annealing is employed because there is adopted the warm working method in which it is difficult to obtain high precision, e.g., warm roll dies working in view of steel material having high contents of alloying elements.

Figure 4:
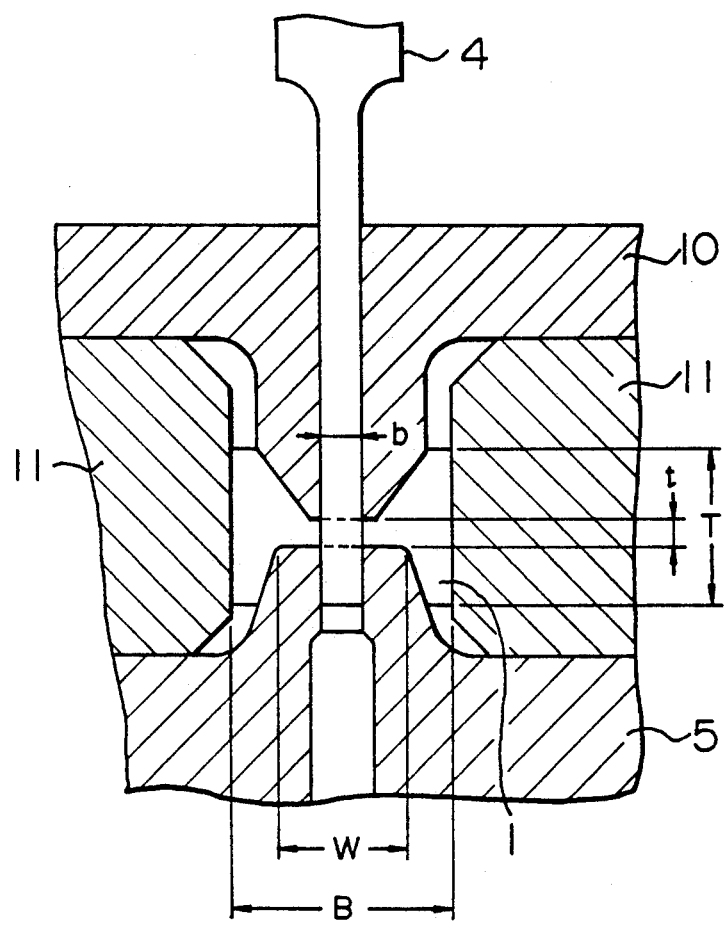
FIG. 4 is a sectional view of a portion of a punching apparatus for forming a series of oil passage holes in a wire which is used as the material of an oil ring.
Figure 5:
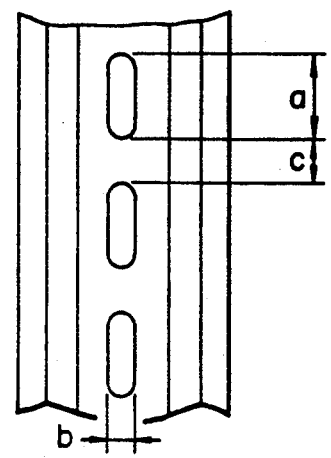
FIG. 5 is a plan view of the wire after the formation of the oil passage holes.

Smooth punching essentially requires particular conditions regarding cross-sectional shape and dimensions etc. Referring to FIGS. 4 and 5, the wire 1 of a modified cross-section is rigidly held and guided by a die 5, lateral guides 11, 11 and an upper guide 10 which also serves as a punch guide. The breadth of the portion of the wire 1 which receives the punching force is determined as $(W-b)$. Since the punch 4 usually has a large cross-sectional flatness ratio $a/b$ of 5:3 as will be seen from FIGS. 4 and 5, the punching force is considered as being proportional to the height t of the hole wall which represents the area of the hole wall. It has been experimentally confirmed that a condition $(W-b) \geq 1.4$ t must be met in order to readily effect the punching without causing breakdown of the dies.

It has also been determined that the condition of $c \geq t$ must be met. This requirement is critical with respect to the prevention of propagation of cracking during bending of the material into a ring, rather than the punching itself. More specifically, when this condition is not met, i.e., on condition of $c<t$, cracks tends to propagate across the bridging portion of the width c between adjacent holes, when the material after punching is bent into a ring form.

As stated before, the material which is to be subjected to the punching is required to have a high degree of straightness. In addition, the variation in the cross-sectional dimensions, particularly dimensional variation in the thicknesswise direction of the web which tends to fluctuate during the plastic working for modifying the cross-section has to be minimized. Preferably, such dimensional variation should be 50 $\mu$m or less, more preferably 30 $\mu$m or less. This requirement basically applies also to variation in breadthwise direction. Dimensional variation in the breadthwise direction, however, is easier to control than the thicknesswise dimensional variation. Such dimensional variations affects the precision of the guide of the material and, hence, the life of the punching apparatus.

It is also necessary to monitor the height of burrs during the punching. Preferably, the burr height should be controlled during the punching so as not to exceed 40 $\mu$m, more preferably, not to exceed 30 $\mu$m. A burr having too great a height may come off during the use, resulting in an engine trouble, and tends to allow a crack to be initiated from the oil passage hole during bending of the wire material into ring form. Control of the burr height is possible through suitable selection of the material hardness, e.g., $HV \geq 200$, suitable determination of the clearance between the punch and dies, and limitation of wear (abrasion) of the punch edge and the die edges, e.g., 0.05 mm or less.

Preferably, the punching is conducted while feeding the wire intermittently so as to form a predetermined number of oil passage holes at a time, thereby reducing the load applied to each pair of punch-dies.

Punches are liable to be broken during the punching. When breakdown of a punch is found, the punching has to be suspended without delay in order to minimize the influence of such accident. To this end, it is advisable to continuously monitor, by a mechanical, electrical or optical monitoring device, so as to confirm that oil passage holes are being formed at right positions. Preferably, the oil passage holes are formed in the same shape and at a constant pitch, in order to simplify the construction of the monitoring device.

Finally, the wire is subjected to the hardening and tempering heat treatment conducted in a continuous heat-treating furnace. The bending of the wire into the form of an oil ring has to be conducted so as to provide a uniform spring back and uniform curvature along the length of the ring. The hardening and tempering, therefore, is conducted in a continuous heat-treating furnace also in the method of the present invention.

According to the invention, the ratio of the web thickness to the overall thickness of the wire of modified cross-section is limited to be 0.3 or less. Production of a wire having a smaller degree of cross-sectional modification, e.g., above 0.3 in terms of the above-mentioned ratio, is still possible, though not easy, by conventional methods. As explained before, it has been a significant technical subject to develop a method which enables production of an oil ring having a large degree of cross-sectional modification, i.e., 0.3 or less in terms of the above-mentioned ratio, while attaining good state of the ring surface, from a steel material having high contents of alloying elements. Such demands are met for the first time by the method of the present invention.

According to the invention, the hardness of the ring is limited to range from HV300 to HV450. A hardness exceeding HV450 tends to undesirably allow the spring back during curling, making it difficult to maintain the curling configuration within a predetermined range and causing a risk of breakdown of the ring during the curling. This tendency is serious particularly in the production of an oil ring having a largely modified cross-section as is the case of the ring to which the present invention pertains. It is therefore essential that the hardness does not exceed HV450. Conversely, when the hardness is below HV300, wear resistance is undesirably reduced to shorten the life of the oil ring, which does not conform with the purpose of use of the steel material having high contents of alloying elements.

After the bending, the sliding surface of the ring for sliding contact with the surface of the cylinder, as well as the end surfaces which contacts with the walls of the ring groove formed in the piston, is lightly polished. On the other hand, the inner surfaces of the inner peripheral groove of the ring operates indirect contact with the spring, without being subjected to polishing. Consequently, all the surfaces of the ring have to be finished to a surface roughness of 3 S or less. It is to be appreciated that the present invention has made it possible for the first time to produce, on an industrial scale, oil rings meeting the above-described requirement for the surface roughness from a steel material having high contents of alloying elements.

A description will now be given of the reasons of limitation of contents of the elements contained in the steel material.

C is combined with additive elements such as Mo, W and V so as to form carbides which contribute to improvement in wear resistance and seizure resistance properties. Part of C also is dissolved as a solid-solution in the matrix so as to strengthen the matrix. In order to obtain appreciable effects, the content of C should exceed 0.8 wt %. The oil ring of the present invention has a largely modified cross-section. The ring material and the product ring, therefore, cannot be satisfactorily formed even by warm working, when the C content is 0.95 wt % or higher. Furthermore, C content exceeding 0.95 wt % impairs resistance to corrosion by sulfuric acid, due to formation of excessive carbides. The C content, therefore, is determined to be higher than 0.8 wt % but less than 0.95 wt %.

Si is added for the purpose of deoxidation during refining of the steel. This element also contributes to improvement in resistance to corrosion by sulfuric acid. The content of this element is limited to be not more than 1 wt %, because presence of this element in excess of 1 wt % impairs warm workability.

Mn is added for the purpose of desulfurization during refining of the steel. The content of this element is limited to be not more than 1 wt %, because presence of this element in excess of 1 wt % impairs hot workability of the material during production of the wire.

Cr is an element which forms carbides upon reaction with C as explained before. More specifically, this element forms carbides of $M_{23}C_6$ type carbide and $M_7C_3$ type carbide which contribute to improvement in wear resistance and seizure resistance properties. This element, therefore, is indispensable in the oil ring material used in the present invention. Part of Cr also is solid-solutioned in the matrix so as to improve anti-acid and heat resistance performance. When the material is subjected to nitriding, this element forms a hard nitrided layer so as to remarkably improve resistance both to acid and heat. When the product is used in ordinary environment which is not a sulfuric-acid corrosive atmosphere, the above-mentioned effects are appreciably attained without reducing toughness, if the Cr content is from 7 to 25 wt % as disclosed, for example, in Japanese Patent Unexamined Publication No. 1-208435. A severer requirement, however, applies when the product is intended for use in a sulfuric-acid corrosive atmosphere so that the Cr content must be further limited. It has been experimentally determined that corrosion weight loss is increased when the Cr content is below 15.0 wt %. This is considered to be attributable to a shortage of carbides. On the other hand, a Cr content exceeding 20.0 wt % causes a reduction in the resistance to sulfuric acid corrosion. This is considered to be attributable to presence of an excessively large amount of nitrides of Cr. For these reasons, the Cr content is determined to range from 15.0 wt % to 20.0 wt %.

Mo and W form their carbides in combination with C and are partially solid-solutioned in Cr carbides to strengthen them. Furthermore, these elements are effective in enhancing resistance to tempering softening and contribute to formation of nitrided layer in nitriding treatment so as to improve resistances to wear and seizure. These elements, therefore, are optionally added. Furthermore, Mo also contributes to improvement in resistance to sulfuric acid corrosion. In order to obtain appreciable effects, one or both of Mo and W should be contained by at least 0.5 wt % in terms of (Mo+W/2). The (Mo+W/2) content, however, should not exceed 3.0 wt % because addition of these elements beyond this upper limit causes a reduction in toughness.

V and Nb make crystal grains small so as to contribute to improvement in toughness. In addition, these elements form their carbides as is the case of Mo and W and are solid-solutioned in Cr carbides to strengthen them. Furthermore, these elements are effective in enhancing resistance to tempering softening. These elements, therefore, may be added to provide these effects. Furthermore, both V and Nb are effective in improving resistance to sulfuric-acid corrosion. In order to make these effects appreciable, one or both of V and Nb should be present in at least 0.05 wt % in terms of (V+Nb/2) content. The (V+Nb/2) content, however, should not exceed 2.0 wt % because presence of these elements in excess of this upper limit impairs toughness due to the occurrence of excess amount of MC type carbide.

Ni and Co improve resistance of nitrided layer and, hence, are important elements in the invention. Neither Ni nor Co form any carbide and are solid-solutioned in the matrix so as to improve resistance to corrosion by sulfuric acid. Additionally, since these elements do not form any nitrides they maintain their effects even in nitrided layer. This specific feature of Ni and Co is particularly useful in the production of piston ring which employs nitriding treatment. A presence of Ni in excess of 5.0 wt % makes it difficult to obtain required hardness in the heat treatment. In addition, Co content exceeding 12 wt % impairs both hot and cold workability. Therefore, the contents of Ni and Co, when these elements are added, are limited to be 5.0 wt % or less and 12 wt % or less, respectively.

Trace amounts of P, S, O and N may be present as ordinary incidental impurities.

EXAMPLES

EXAMPLE 1

Oil rings were produced by the method of the invention from various materials meeting the requirements of the invention, as well as from comparison materials. Chemical compositions of these materials are shown in Table 1. The comparison material is 0.65% C-13.5% Cr-0.3% Mo-0.1% V-balance Fe material which has been conventionally used as the material of two-pieces oil rings.

The production was conducted in accordance with the following process.

Figure 2:
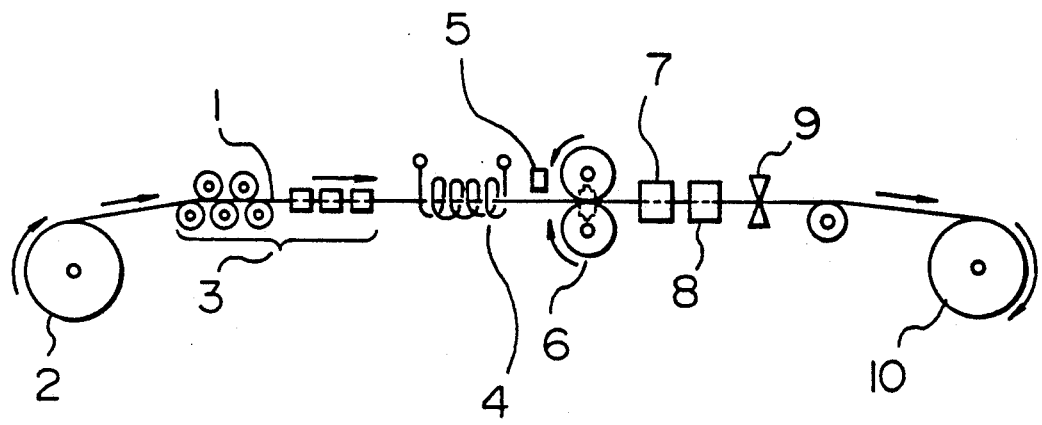
FIG. 2 is a schematic illustration of a warm roll dies apparatus used in a method in accordance with the present invention.

In the first step, each of the materials shown in Table 1 was hot-rolled to a wire of about 6 mm diameter and the wire was coiled. The wire was then subjected to shaving so as to remove any surface defect and was warm-drawn into a wire of 4.0 mm diameter. The wire was then rolled into a wire having a flattened rectangular cross-section with round corners, by a power-driven quadruple roller apparatus. Each of the thus obtained flattened wires was then deformed into a wire having a modified cross-section, by warm roll dies working effected by progressively advancing bore dies at a temperature of about 800° C. in a working apparatus of the type schematically shown in FIG. 2. The wire was then cold-worked by an apparatus which is substantially the same as that shown in FIG. 2 except that the heater and the temperature sensor were omitted, whereby a grooved wire with modified cross-section as shown in FIG. 1 was obtained. The ratio (tw/T) of the web thickness tw to the total thickness T was about 0.2.

Each grooved wire of modified cross-section thus obtained was checked for any crack by an eddy-current type flaw detector. No crack was found although all portion of the grooved wire including the boundaries between web and flanges were checked.

EXAMPLE 2

Wires produced from the materials shown in Table 1 were subjected to nitriding and the nitrided wire were tested for the purpose of evaluation of anti-scuffing property, wear amount and amount of corrosion wear, i.e., amount of wear under corrosive condition. The evaluation was normalized by the values obtained with the wire made from the comparison material, i.e., in terms of percents of the values exhibited by the comparison wire. The test was conducted by employing an adhesive wear tester of the specification as shown in FIG. 3. More specifically, this tester has a pair of V blocks made of FC25 which clamp therebetween a test piece rotating at 300 rpm, the clamping force being varied to apply different levels of load. Wet-type testing method employing dripping of lubricating oil was adopted in the test. The process for preparing the test piece was as follows. Each test material was roughly machined into a predetermined shape and was refined to a hardness of HRC40(HV392) by hardening and tempering, followed by a gas nitriding which was conducted for 20 hours at 540° C. Finally, the test material was ground for the purpose of removing fragile nitrides on the outermost layer, whereby the test piece was obtained. The amount of wear was measured by operating the tester under a predetermined level of load for a predetermined time and measuring the reduction in the weight of the test piece after the operation. The anti-scuffing property was measured by progressively increasing the load on the V blocks and sensing occurrence of a seizure from a change in the driving torque of the test piece. Thus, the anti-scuffing property is determined as the level of the load at which a seizure occurs. The amount of corrosion wear measured by determining the difference between the weight before the test and the weight after the test, employing an oil containing 2.0% of sulfuric acid as the test lubricant.

From Table 2, it will be seen that the oil ring exhibits improved properties in terms of wear, anti-scuffing property and corrosion-wear resistance, by virtue of increase in C and Cr contents and suitable selection of contents of W, Mo, V, Nb, Ni and Co, thus achieving the aforesaid object of the present invention.

TABLE 1

|  |  | C | Si | Mn | Cr | Mo | W | V | Nb | Co | Ni | Fe (weight %) |
|---|---|---|---|---|---|---|---|---|---|---|---|---|
| Materials | 1 | 0.92 | 0.42 | 0.35 | 18.5 | — | — | — | — | — | — | Bal. |
| of | 2 | 0.83 | 0.34 | 0.42 | 17.3 | — | — | — | — | — | — | " |
| Invention | 3 | 0.90 | 0.35 | 0.51 | 15.7 | — | — | — | — | — | — | " |
|  | 4 | 0.85 | 0.44 | 0.41 | 17.6 | — | 0.52 | — | — | — | — | " |
|  | 5 | 0.91 | 0.34 | 0.37 | 17.4 | 0.71 | — | — | — | — | — | " |
|  | 6 | 0.82 | 0.41 | 0.41 | 16.2 | 0.40 | 0.42 | — | — | — | — | " |
|  | 7 | 0.85 | 0.37 | 0.34 | 15.2 | — | — | 0.09 | — | — | — | " |
|  | 8 | 0.84 | 0.40 | 0.37 | 16.8 | — | — | 0.04 | 0.86 | — | — | " |
|  | 9 | 0.85 | 0.40 | 0.41 | 19.1 | — | — | — | 0.12 | — | — | " |
|  | 10 | 0.93 | 0.37 | 0.42 | 17.6 | 0.72 | — | 0.16 | — | — | — | " |
|  | 11 | 0.88 | 0.29 | 0.35 | 16.9 | 0.51 | 0.24 | 0.11 | — | — | — | " |
|  | 12 | 0.82 | 0.35 | 0.37 | 17.5 | — | — | — | — | 4.1 | — | " |
|  | 13 | 0.81 | 0.36 | 0.41 | 18.1 | — | — | — | — | — | 1.6 | " |
|  | 14 | 0.85 | 0.44 | 0.54 | 17.3 | 0.41 | 0.25 | — | — | 3.7 | — | " |
|  | 15 | 0.83 | 0.28 | 0.35 | 17.5 | — | — | — | — | 9.6 | 3.2 | " |
|  | 16 | 0.83 | 0.41 | 0.32 | 17.6 | — | 1.7 | 0.12 | — | 3.5 | — | " |
|  | 17 | 0.83 | 0.41 | 0.36 | 18.2 | — | — | 0.10 | 0.11 | — | 0.5 | " |
|  | 18 | 0.82 | 0.32 | 0.23 | 17.3 | 0.32 | 0.44 | 0.08 | 0.02 | 2.1 | 0.3 | " |
| Comparison |  | 0.65 | 0.37 | 0.37 | 13.5 | 0.31 | — | 0.07 | — | — | — | Bal. |

TABLE 1-continued

|  | C | Si | Mn | Cr | Mo | W | V | Nb | Co | Ni | Fe |
|---|---|---|---|---|---|---|---|---|---|---|---|
|  |  |  |  |  |  |  |  |  |  | (weight %) |  |
| Material |  |  |  |  |  |  |  |  |  |  |  |

TABLE 2

|  | No. | Ratio of wear amount | Anti-scuffing property (Ratio of pressure at seizure) | Ratio of corrosion wear resistance |
|---|---|---|---|---|
| Materials of Invention | 1 | 77 | 139 | 93 |
|  | 2 | 80 | 112 | 90 |
|  | 3 | 86 | 130 | 92 |
|  | 4 | 83 | 130 | 95 |
|  | 5 | 79 | 121 | 91 |
|  | 6 | 81 | 117 | 90 |
|  | 7 | 86 | 111 | 92 |
|  | 8 | 84 | 134 | 89 |
|  | 9 | 77 | 146 | 86 |
|  | 10 | 76 | 128 | 89 |
|  | 11 | 80 | 161 | 89 |
|  | 12 | 79 | 127 | 83 |
|  | 13 | 84 | 143 | 87 |
|  | 14 | 77 | 189 | 81 |
|  | 15 | 62 | 160 | 41 |
|  | 16 | 76 | 143 | 77 |
|  | 17 | 82 | 145 | 93 |
|  | 18 | 77 | 145 | 94 |
| Comparison material |  | 100 | 100 | 100 |

EXAMPLE 3

Each wire of modified cross-section obtained in Example 1 was then subjected to punching for the purpose of forming oil passage holes. The punching was effected by an apparatus explained before in connection with FIG. 4. Namely, the punching apparatus has, in addition to a plurality of punches 4, single dies 5, a pair of lateral guides 11, 11, and an upper guide 10 serving also as a punch guide which in cooperation substantially surround the entire circumference of the material and slidingly guide the same. Referring to FIGS. 4 and 5, the dimensions of the wire and essential parts of the punching apparatus were as follows: the overall breadth B of the wire 3.8 mm, overall height T of left and right halves of cross-section 2.3 mm, thickness t' of the web 0.65 mm, width W of bottom of one of the grooves 2.6 mm, breadth b of the oil passage hole 0.8 mm, length of the oil passage hole 3.5 mm, distance c of between the oil passage hole 1.0 mm, and height t of the breadthwise wall surface of the oil passage hole 0.65 mm. Oil passage holes were formed by punching using this punching apparatus. 5000 cycles of punching operation, with three holes formed simultaneously in each cycle, were executed.

No breakdown of punches and dies was found during the production of each lot, although a slight wear of 0.020 mm or so was observed at edges of the punches and dies. Variation in the pitch of the punched holes was as small as ±0.050 mm which is quite acceptable. Heights of burrs around the oil passage holes of each test piece were confirmed to be not greater than 0.020 mm.

Each wire of modified cross-section with oil passage holes formed therein was hardened and tempered to a hardness of about HV400 and was bent continuously into a ring form of an inside diameter 90 mm. Breakdown of the wire starting from burr, as well as breakdown due to other reasons, was not found at all during bending.

Surface roughness of each sample after the heat treatment was measured by a touch stylus method. The surface roughness was on the order of 0.6 to 1.4 μmRax on all the samples, thus meeting the requirement of the surface roughness being 3 S or below. Furthermore, all the tolerances of dimensions, the smallest tolerance being 0.06 mm, were cleared.

The sample wire Nos. 1 to 18 shown in Table 1 were bent into rings of a predetermined diameter and were cut and nitrided. All these processes could be accomplished without substantial problem.

As will be understood from the foregoing description, the present invention provides an oil ring which exhibits remarkable improvement in wear resistance and other properties by virtue of increased contents of alloying elements. The reduction in the workability caused by the increase in the contents of alloying elements, which is critical particularly in the case of a two-piece oil ring due to complicated cross-sectional shape, e.g., H- or X-shape, is overcome by the novel method of the invention which enables production of a steel wire having a largely modified cross-section. Furthermore, the method of the present invention makes it possible to obtain a wire of a largely modified cross-section with a high degree of straightness by annealing in a continuous heat-treating furnace, thus ensuring ready introduction of the wire into the punching apparatus, whereby oil passages are formed exactly in a constant pitch and in predetermined size and shape.

Although the invention has been described through its preferred forms, it is to be understood that various modifications and changes may be imparted thereto without departing from the scope of the present invention which is limited solely by the appended claims.

What is claimed is:

1. A two-piece oil ring for use in an internal combustion engine, made from a base material with a substantially rectangular shape cross-section, said base material consisting essentially of more than 0.8 wt % but less than 0.95 wt % of C, not more than 1.0 wt % of Si, not more than 1.0 wt % of Mn, from 15.0 wt % to 20.0 wt % of Cr and the balance substantially Fe and incidental impurities, said base material having been subjected to a hardening and tempering so as to exhibit a hardness ranging from HV300 to HV450, said oil ring having a substantially H- or X-shaped cross-section defined by radially inner and outer circumferential grooves formed therein, a web portion interconnecting left and right halves of the H- or X-shaped cross-section having a thickness not greater than 0.3 in terms of a ratio to a total thickness of said left and right halves, said oil ring further having a plurality of oil passage holes formed in said web portion at a spacing from one another in a circumferential direction and a nitrided layer formed on at least a sliding surface thereof which makes a sliding contact with an inner surface of a cylinder of said internal combustion engine, and wherein at least one of said grooves has a substantially flat bottom, and wherein the following conditions are met:

$W - b \geq 1.4\ t$, $C \geq t$, wherein:
- W = a width of said substantially flattened bottom of the circumferential groove,
- b = a breadth of said oil passage hole,
- t = a height of a breadthwise wall surface of said oil passage hole, and
- c = the spacing between adjacent oil passage holes.

2. A two-piece oil ring for use in an internal combustion engine, made from a base material consisting essentially of more than 0.8 wt % but less than 0.95 wt % of C, not more than 1.0 wt % of Si, not more than 1.0 wt % of Mn, from 15.0 wt % to 20.0 wt % of Cr, 0.5 to 3.0 wt % of one or both of Mo and W in terms of (Mo+W/2) and the balance substantially Fe and incidental impurities, said base material having been subjected to hardening and tempering so as to exhibit a hardness ranging from HV300 to HV450, said oil ring having a substantially H- or X-shaped cross-section defined by radially inner and outer circumferential grooves formed therein, a web portion interconnecting left and right halves of the H- or X-shaped cross-section having a thickness which is not greater than 0.3 in terms of a ratio to a total thickness of said left and right halves, said oil ring further having a plurality of oil passage holes formed in said web portion at a spacing from one another in a circumferential direction and a nitrided layer formed on at least a sliding surface thereof which makes a sliding contact with an inner surface of a cylinder of said internal combustion engine, and wherein at least one of said grooves has a substantially flat bottom, and wherein the following conditions are met:

$W - b \geq 1.4\ t$, $C \geq t$, wherein:
- W = a width of said substantially flattened bottom of the circumferential groove,
- b = a breadth of said oil passage hole,
- t = a height of a breadthwise wall surface of said oil passage hole, and
- c = the spacing between adjacent oil passage holes.

3. A two-piece oil ring for use in an internal combustion engine, made from a base material consisting essentially of more than 0.8 wt % but less than 0.95 wt & of C, not more than 1.0 wt % of Si, not more than 1.0 wt % of Mn, from 15.0 wt % to 20.0 wt % of Cr, 0.5 to 2.0 wt % of one or both of V and Nb in terms of (V+Nb/2) and the balance substantially Fe and incidental impurities, said base material having been subjected to hardening and tempering so as to exhibit a hardness ranging from HV300 to HV450, said oil ring having a substantially H- or X-shaped cross-section defined by radially inner and outer circumferential grooves formed therein, a web portion interconnecting left and right halves of the H- or X-shaped cross-section having a thickness which is not greater than 0.3 in terms of a ratio to a total thickness of said left and right halves, said oil ring further having a plurality of oil passage holes formed in said web portion at a spacing from one another in a circumferential direction and a nitrided layer formed on at least a sliding surface thereof which makes a sliding contact with an inner surface of a cylinder of said internal combustion engine, and wherein at least one of said grooves has a substantially flat bottom, and wherein the following conditions are met:

$W - b \geq 1.4\ t$, $C \geq t$, wherein:
- W = a width of said substantially flattened bottom of the circumferential groove,
- b = a breadth of said oil passage hole,
- t = a height of a breadthwise wall surface of said oil passage hole, and
- c = the spacing between adjacent oil passage holes.

4. A two-piece oil ring for use in an internal combustion engine, made from a base material consisting essentially of more than 0.8 wt % but less than 0.95 wt % of C, not more than 1.0 wt % of Si, not more than 1.0 wt % of Mn, from 15.0 wt % to 20.0 wt % of Cr, 0.5 to 3.0 wt % of one or both of Mo and W in terms of (Mo+W/2), 0.05 to 2.0 wt % of one or both of V and Nb in terms of (V+Nb/2) and the balance substantially Fe and incidental impurities, said base material having been subjected to hardening and tempering so as to exhibit a hardness ranging from HV300 to HV450, said oil ring having a substantially H- or X-shaped cross-section defined by radially inner and outer circumferential grooves formed therein, a web portion interconnecting left and right halves of the H- or X-shaped cross-section having a thickness which is not greater than 0.3 in terms of a ratio to a total thickness of said left and right halves, said oil ring further having a plurality of oil passage holes formed in said web portion at a spacing from one another in a circumferential direction and a nitrided layer formed on at least a sliding surface thereof which makes a sliding contact with an inner surface of a cylinder of said internal combustion engine, and wherein at least one of said grooves has a substantially flat bottom, and wherein the following conditions are met:

$W - b \geq 1.4\ t$, $C \geq t$, wherein:
- W = a width of said substantially flattened bottom of the circumferential groove,
- b = a breadth of said oil passage hole,
- t = a height of a breadthwise wall surface of said oil passage hole, and
- c = the spacing between adjacent oil passage holes.

5. A two-piece oil ring according to any one of claims 1 to 4, wherein said base material further contains one or both of not more than 12.0 wt % of Co and not more than 5.0 wt % of Ni.

6. A steel wire for use as a material of a two-piece oil ring of an internal combustion engine, said oil ring being made from a base material consisting essentially of more than 0.8 wt % but less than 0.95 wt % of C, not more than 1.0 wt % of Si, not more than 1.0 wt % of Mn, from 15.0 wt % to 20.0 wt % of Cr and the balance substantially Fe and incidental impurities, said base material having been subjected to hardening and tempering so as to exhibit a hardness ranging from HV300 to HV450, said steel wire having a substantially H- or X-shaped cross-section defined by grooves formed in opposite surfaces thereof so as to provide, when said wire is formed into said oil ring, radially inner and outer circumferential grooves, a web portion interconnecting left and right halves of the H- or X-shaped cross-section having a thickness which is not greater than 0.3 in terms of a ratio to a total thickness of said left and right halves, and said wire further having a plurality of oil passage holes formed in said web portion at a predetermined spacing in a longitudinal direction of said wire, and wherein the following conditions are met:

$$W - b \geq 1.4\,t,$$

$$C \geq t,$$

wherein:
W = a width of said substantially flattened bottom of the circumferential groove,
b = a breadth of said oil passage hole,
t = a height of a breadthwise wall surface of said oil passage hole, and
c = a spacing between adjacent oil passage holes.

7. A steel wire for use as a material of a two-piece oil ring of an internal combustion engine, said oil ring being made from a base material consisting essentially of more than 0.8 wt % but less than 0.95 wt % of C, not more than 1.0 wt % of Si, not more than 1.0 wt % of Mn, from 15.0 wt % to 20.0 wt % of Cr 0.5 to 3.0 wt % of one or both of Mo and W in terms of (Mo+W/2) and the balance substantially Fe and incidental impurities, said base material having been subjected to hardening and tempering so as to exhibit a hardness ranging from HV300 to HV450, said steel wire having a substantially H- or X-shaped cross-section defined by grooves formed in opposite surfaces thereof so as to provide, when said wire is formed into said oil ring, radially inner and outer circumferential grooves, a web portion interconnecting left and right halves of the H- or X-shaped cross-section having a thickness which is not greater than 0.3 in terms of a ratio to a total thickness of said left and right halves, and said wire further having a plurality of oil passage holes formed in said web portion at a predetermined spacing in a longitudinal direction of said wire, and wherein the following conditions are met:

$$W - b \geq 1.4t,$$

$$C \geq t,$$

wherein:
W = a width of said substantially flattened bottom of the circumferential groove,
b = a breadth of said oil passage hole,
t = a height of a breadthwise wall surface of said oil passage hole, and
c = a spacing between adjacent oil passage holes.

8. A steel wire for use as a material of a two-piece oil ring of an internal combustion engine, said oil ring being made from a base material consisting essentially of more than 0.8 wt % but less than 0.95 wt % of C, not more than 1.0 wt % of Si, not more than 1.0 wt % of Mn, from 15.0 wt % to 20.0 wt % of Cr 0.5 to 2.0 wt % of one or both of V and Nb in terms of (V+Nb/2) and the balance substantially Fe and incidental impurities, said base material having been subjected to hardening and tempering so as to exhibit a hardness ranging from HV300 to HV450, said steel wire having a substantially H- or X-shaped cross-section defined by grooves formed in opposite surfaces thereof so as to provide, when said wire is formed into said oil ring, radially inner and outer circumferential grooves, a web portion interconnecting left and right halves of the H- or X-shaped cross-section having a thickness which is not greater than 0.3 in terms of a ratio to a total thickness of said left and right halves, and said wire further having a plurality of oil passage holes formed in said web portion at a predetermined spacing in a longitudinal direction of said wire, and wherein the following conditions are met:

$$W - b \geq 1.4t,$$

$$c \geq t,$$

wherein:
W = a width of said substantially flattened bottom of the circumferential groove,
b = a breadth of said oil passage hole,
t = a height of a breadthwise wall surface of said oil passage hole, and
c = a spacing between adjacent oil passage holes.

9. A steel wire for use as a material of a two-piece oil ring of an internal combustion engine, said oil ring being made from a base material consisting essentially of more than 0.8 wt % but less than 0.95 wt % of C, not more than 1.0 wt % of Si, not more than 1.0 wt % of Mn, from 15.0 wt % to 20.0 wt % of Cr 0.5 to 3.0 wt % of one or both of Mo and W in terms of (Mo+W/2) 0.05 to 2.0 wt % of one or both of V and Nb in terms of (V+Nb/2) and the balance substantially Fe and incidental impurities, said base material having been subjected to hardening and tempering so as to exhibit a hardness ranging from HV300 to HV450, said steel wire having a substantially H- or X-shaped cross-section defined by grooves formed in opposite surfaces thereof so as to provide, when said wire is formed into said oil ring, radially inner and outer circumferential grooves, a web portion interconnecting left and right halves of the H- or X-shaped cross-section having a thickness which is not greater than 0.3 in terms of a ratio to a total thickness of said left and right halves, said wire further having a plurality of oil passage holes formed in said web portion at a predetermined spacing in a longitudinal direction of said wire, and wherein the following conditions are met:

$$W - b \geq 1.4t,$$

$$c \geq t,$$

wherein:
W = a width of said substantially flattened bottom of the circumferential groove,
b = a breadth of said oil passage hole,
t = a height of a breadthwise wall surface of said oil passage hole, and
c = a spacing between adjacent oil passage holes.

10. A steel wire according to one of claims 6 to 9, wherein said base material further contains one or both of not more than 12.0 wt % of Co and not more than 5.0 wt % of Ni.

11. A steel wire according to one of claims 6 to 9, wherein at least one of said grooves has a substantially flat bottom, and wherein the following conditions are met:

$$W - b \geq 1.4\,t,$$

$$C \geq t,$$

wherein:
- W = a width of said substantially flattened bottom of the circumferential groove,
- b = a breadth of said oil passage hole,
- t = a height of a breadthwise wall surface of said oil passage hole, and
- c = a spacing between adjacent oil passage holes.

12. A method of producing a steel wire for use as a material of a two-piece oil ring of an internal combustion engine, the method comprising the steps of:

preparing a round wire of a martensitic stainless steel material so as to have a substantially rectangular cross section, said material containing more than 0.8 wt % but less than 0.95 wt % of C and from 15.0 wt % to 20.0 wt % of Cr;

forming said material into a wire having a substantially H- or X-shaped cross-section of said two-piece oil ring, through a warm plastic working effected by power-driven or non-driven roll dies;

annealing said wire by a continuous annealing furnace;

forming oil passage holes in a web portion of said wire by punching; and subjecting said wire to a continuous hardening and tempering so as to obtain a hardness of said wire ranging from HV300 to HV450.

13. A method of producing a steel wire for use as a material of a two-piece oil ring of an internal combustion engine according to claim 12, wherein the step of forming said oil passage holes is conducted by simultaneously forming a series of oil passage holes by punching.

* * * * *